(12) United States Patent
Lentz (10) Patent No.: US 10,151,321 B2
(45) Date of Patent: Dec. 11, 2018

(54) AUXILIARY POWER UNIT IMPELLER BLADE

(71) Applicant: United Technologies Corporation, Farmington, CT (US)

(72) Inventor: John Craig Lentz, Poway, CA (US)

(73) Assignee: United Technologies Corporation, Farmington, CT (US)

( * ) Notice: Subject to any disclaimer, the term of this patent is extended or adjusted under 35 U.S.C. 154(b) by 390 days.

(21) Appl. No.: 15/028,448

(22) PCT Filed: Oct. 13, 2014

(86) PCT No.: PCT/US2014/060225
§ 371 (c)(1),
(2) Date: Apr. 11, 2016

(87) PCT Pub. No.: WO2015/057544
PCT Pub. Date: Apr. 23, 2015

(65) Prior Publication Data
US 2016/0252100 A1 Sep. 1, 2016

Related U.S. Application Data

(60) Provisional application No. 61/891,489, filed on Oct. 16, 2013.

(51) Int. Cl.
*F01D 25/12* (2006.01)
*F01D 5/28* (2006.01)
(Continued)

(52) U.S. Cl.
CPC ........... *F04D 29/284* (2013.01); *F01D 5/048* (2013.01); *F01D 5/3061* (2013.01); *F04D 29/30* (2013.01);
(Continued)

(58) Field of Classification Search
None
See application file for complete search history.

(56) References Cited

U.S. PATENT DOCUMENTS 4,967,565 A 11/1990 Thomson et al.
5,014,518 A 5/1991 Thomson et al.
(Continued)

OTHER PUBLICATIONS

International Preliminary Report on Patentability for International Application No. PCT/US2014/060225 dated Apr. 28, 2016.
(Continued)

*Primary Examiner* — Logan Kraft
*Assistant Examiner* — Justin A Pruitt
(74) *Attorney, Agent, or Firm* — Carlson, Gaskey & Olds, P.C.

(57) ABSTRACT

A compressor impeller for an Auxiliary Power Unit (APU) includes a hub including a plurality of splitter blades interposed between a plurality of main blades. Each of the plurality of splitter blades and the plurality of main blades include a first surface and a second surface. The first surface and the second surface of the plurality of splitter blades are defined as a set of X-coordinates, Y-coordinates and Z-coordinates set out in Table S-1 and S-2 scaled by a desired factor. The X-coordinate being in an axial direction, the Y-coordinate being in a first radial direction and the Z-coordinate being in a second radial direction transverse to the first radial direction. Each of the plurality of splitter blades includes a contour between the tip and the leading edge. An auxiliary power unit and method are also disclosed.

18 Claims, 6 Drawing Sheets

(51) Int. Cl.
    *F01D 9/04*       (2006.01)
    *F01D 25/14*     (2006.01)
    *F01D 25/30*     (2006.01)
    *F02K 1/82*       (2006.01)
    *F04D 29/28*     (2006.01)
    *F01D 5/04*       (2006.01)
    *F04D 29/30*     (2006.01)
    *F01D 5/30*       (2006.01)

(52) U.S. Cl.
    CPC ...... *F05D 2220/50* (2013.01); *F05D 2230/50* (2013.01); *F05D 2240/307* (2013.01); *F05D 2250/74* (2013.01); *Y02T 50/673* (2013.01)

(56) References Cited

U.S. PATENT DOCUMENTS

| | | |
|---|---|---|
| 5,133,194 A | 7/1992 | Army, Jr. et al. |
| 5,142,762 A | 9/1992 | Dziomy et al. |
| 5,213,473 A | 5/1993 | Fiala |
| 5,249,934 A | 10/1993 | Merritt et al. |
| 5,309,735 A | 5/1994 | Maher, Jr. et al. |
| 5,554,000 A | 9/1996 | Katoh et al. |
| 5,921,683 A | 7/1999 | Merritt et al. |
| 6,062,819 A | 5/2000 | Zangeneh et al. |
| 6,427,471 B1 | 8/2002 | Ando et al. |
| 6,454,535 B1 | 9/2002 | Goshorn et al. |
| 6,471,482 B2 | 10/2002 | Montgomery et al. |
| 7,186,090 B2 | 3/2007 | Tomberg et al. |
| 7,198,470 B2 | 4/2007 | Enomoto et al. |
| 7,384,243 B2 | 6/2008 | Noshi |
| 7,497,663 B2 | 3/2009 | McRae, Jr. et al. |
| 7,500,299 B2 | 3/2009 | Dupeux et al. |
| 7,572,104 B2 | 8/2009 | Hudson et al. |
| 7,779,644 B2 | 8/2010 | Decrisantis et al. |
| 8,167,540 B2 | 5/2012 | Schlinker et al. |
| 8,360,730 B2 | 1/2013 | Chen et al. |
| 8,529,210 B2 | 9/2013 | Merritt et al. |
| 8,579,591 B2 | 11/2013 | Ho et al. |
| 2006/0016172 A1 | 1/2006 | Bradbrook |
| 2008/0289332 A1 | 11/2008 | Decker et al. |
| 2009/0220346 A1 | 9/2009 | Schluter et al. |
| 2013/0011266 A1 | 1/2013 | Gallagher et al. |
| 2013/0115067 A1 | 5/2013 | Bronfeld et al. |

OTHER PUBLICATIONS

International Search Report and Written Opinion for International Application No. PCT/US2014/060225 dated Jan. 22, 2015.

AUXILIARY POWER UNIT IMPELLER BLADE

CROSS REFERENCE TO RELATED APPLICATION

This application claims priority to U.S. Provisional Application No. 61/891,489 filed on Oct. 16, 2013.

BACKGROUND

An Auxiliary power unit (APU) is provided in an aircraft to provide power to aircraft systems to either supplement or substitute power generated by the main engines. An APU is typically a small gas turbine engine that is mounted within the aircraft fuselage and which draws air through inlets defined within the outer skin of the aircraft. The compressor section includes a compressor wheel that includes contoured blades. The contoured blades are subject to flow forces and rotational forces that may generate a resonance frequency in the contoured blades.

SUMMARY

A compressor impeller for an Auxiliary Power Unit (APU) according to an exemplary embodiment of this disclosure, among other possible things includes a hub including a plurality of splitter blades interposed between a plurality of main blades. Each of the plurality of splitter blades and the plurality of main blades include a first surface and a second surface. The first surface and the second surface of the plurality of splitter blades are defined as a set of X-coordinates, Y-coordinates and Z-coordinates set out in Table S-1 and S-2 scaled by a desired factor. The X-coordinate being in an axial direction, the Y-coordinate being in a first radial direction and the Z-coordinate being in a second radial direction transverse to the first radial direction. Each of the plurality of splitter blades includes a contour between the tip and the leading edge.

In a further embodiment of the foregoing compressor impeller, a first surface and a second surface of the plurality of main blades are defined as a set of X-coordinates, Y-coordinates and Z-coordinates set out in Table M-1 and M-2 scaled by a desired factor. The X-coordinate being in an axial direction, the Y-coordinate being in a first radial direction and the Z-coordinate being in a second radial direction transverse to the first radial direction.

In a further embodiment of any of the foregoing compressor impellers, the first surface and the second surface are defined by corresponding Tables M-1, M-2, S1 and S2 are adjusted by a manufacturing tolerance.

In a further embodiment of any of the foregoing compressor impellers, the contour includes a surface disposed at angle less than about 90 degrees relative to a leading edge of one or more of the plurality of splitter blades and the plurality of main blades that intersects the leading edge and the tip.

In a further embodiment of any of the foregoing compressor impellers, the angle is between about 35 degrees and about 65 degrees relative to the leading edge.

In a further embodiment of any of the foregoing compressor impellers, the hub includes a front surface from which the plurality of splitter and plurality of main blades extends. The front surface is defined as a set of X-coordinates and Rh-coordinates set out in Table H1. X-coordinates extend axially and the Rh-coordinate extend radially.

In a further embodiment of any of the foregoing compressor impellers, the hub includes a back side surface defined as a set of X-coordinates and Rb-coordinates set out in Table H2. The X-coordinates extend axially and the Rb-coordinates extend radially.

An auxiliary power unit according to an exemplary embodiment of this disclosure, among other possible things includes a compressor section including an impeller. The impeller includes a plurality of splitter blades interposed between a plurality of main blades. Each of the plurality of splitter blades includes a suction side and a pressure side. The suction side and the pressure side are defined by a set of X-coordinates, Y-coordinates and Z-coordinates defined according to a corresponding one of Table S1 and Table S2 scaled by a desired factor. The X-coordinate being in an axial direction, the Y-coordinate being in a first radial direction and the Z-coordinate being in a second radial direction transverse to the first radial direction. Each of the plurality of splitter blades includes a contour between a tip and a leading edge.

In a further embodiment of the foregoing auxiliary power unit, a suction side and a pressure side of the plurality of main blades are defined as a set of X-coordinates, Y-coordinates and Z-coordinates set out in Table M-1 and M-2 scaled by a desired factor. The X-coordinate being in an axial direction, the Y-coordinate being in a first radial direction and the Z-coordinate being in a second radial direction transverse to the first radial direction.

In a further embodiment of any of the foregoing auxiliary power units, the suction side and the pressure side defined by corresponding Tables M-1, M-2, S1 and S2 are adjusted by a manufacturing tolerance.

In a further embodiment of any of the foregoing auxiliary power units, the contour includes a surface disposed at angle less than about 90 degrees relative to the leading edge that intersects the leading edge and the tip.

In a further embodiment of any of the foregoing auxiliary power units, the angle of the contour is between about 35 degrees and about 65 degrees relative to the leading edge.

In a further embodiment of any of the foregoing auxiliary power units, the impeller includes a hub and the hub includes a front surface from which the plurality of splitter and plurality of main blades extends. The front surface is defined as a set of X-coordinates and Rh-coordinates set out in Table H1. X-coordinates extend axially and the Rh-coordinate extend radially.

In a further embodiment of any of the foregoing auxiliary power units, the impeller includes a hub and the hub includes a back face defined as a set of X-coordinates and Rb-coordinates set out in Table H2. The X-coordinates extend axially and the Rb-coordinates extend radially.

In a further embodiment of any of the foregoing auxiliary power units, includes a combustor section and a turbine section coupled to the compressor section through a main shaft. The combustor section is configured to mix compressed air from the compressor section with fuel and to ignite the fuel air mixture to generate a high-speed exhaust gas flow that expands through the turbine section to drive the compressor section.

A method of manufacturing a compressor wheel for an auxiliary power unit according to an exemplary embodiment of this disclosure, among other possible things includes forming an compressor wheel to include a plurality of splitter blades interposed between a plurality of main blades. Each of the plurality of splitter blades include a root, a tip, a leading edge, a suction side and a pressure side. The suction side and the pressure side are defined by a set of X-coordinates, Y-coordinates and Z-coordinates defined according to a corresponding one of Table S1 and Table S2 scaled by a desired factor. The X-coordinate being in an axial direction, the Y-coordinate being in a first radial direction and the Z-coordinate being in a second radial direction transverse to the first radial direction. Each of the plurality of splitter blades includes a contour between the tip and the leading edge.

In a further embodiment of the foregoing method, further includes configuring the compressor wheel such that a suction side and a pressure side of the plurality of main blades are defined as a set of X-coordinates, Y-coordinates and Z-coordinates set out in Table M-1 and M-2 scaled by a desired factor. The X-coordinate being in an axial direction, the Y-coordinate being in a first radial direction and the Z-coordinate being in a second radial direction transverse to the first radial direction.

In a further embodiment of any of the foregoing methods, further includes configuring the contour as a surface disposed at angle between about 35 degrees and about 65 degrees relative to the leading edge that intersects the leading edge and the tip.

DETAILED DESCRIPTION

Figure 1:
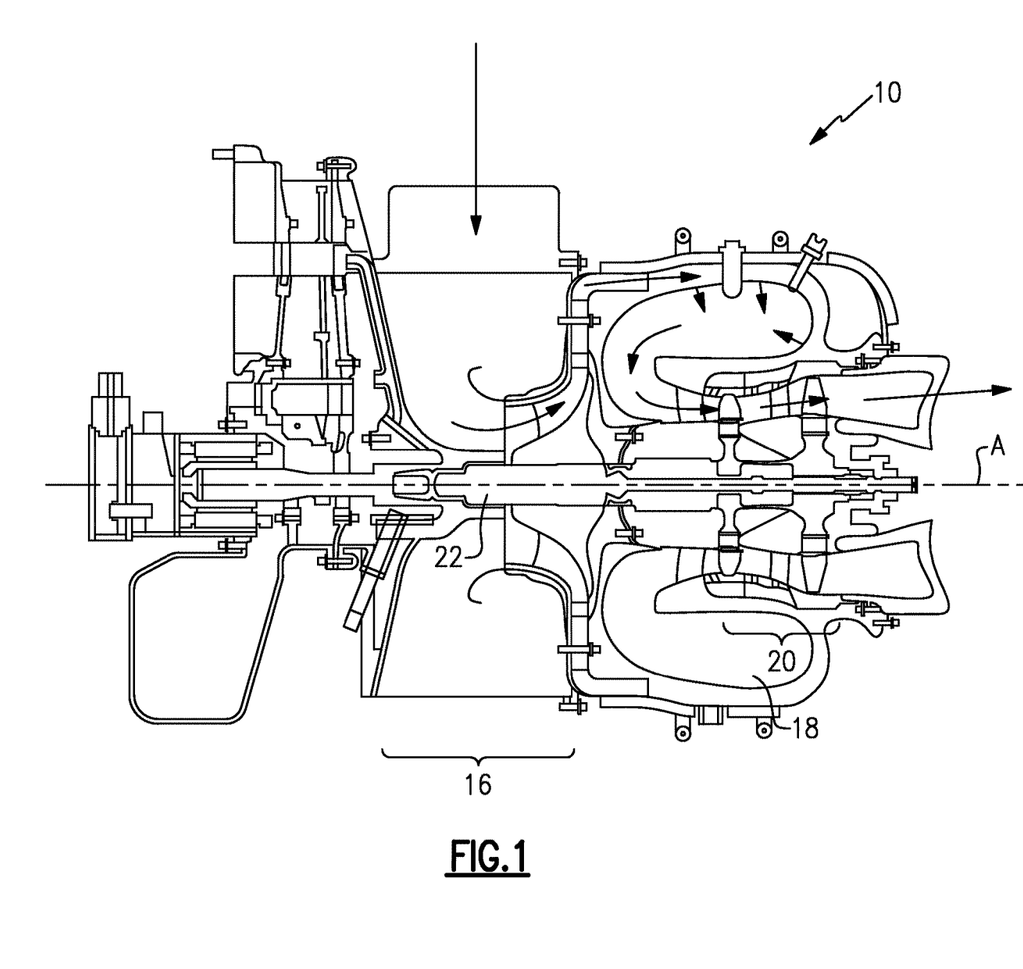
FIG. 1 is a cross section of an embodiment of an auxiliary power unit.
Figure 2:
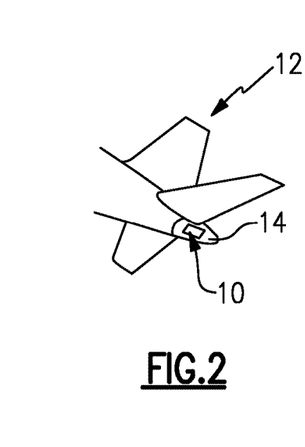
FIG. 2 is a schematic representation of an aircraft tail cone including an embodiment of an auxiliary power unit.

Referring to FIGS. 1 and 2, an embodiment of an auxiliary power unit (APU) 10 is illustrated. The APU 10, in one embodiment, is located in a tail cone 14 of an aircraft 12. The auxiliary power unit 10 provides power to the aircraft independent of the main propulsion engines during ground operations and in some instances during flight.

The auxiliary power unit 10 includes a compressor section 16 that compresses incoming air and communicates that air to a combustor 18. In the combustor 18, fuel is mixed with the compressed air and ignited to generate a high velocity gas flow that expands through a turbine 20. The turbine 20 and compressor section 16 are supported on a common shaft 22 and rotate about an axis A.

Figure 3:
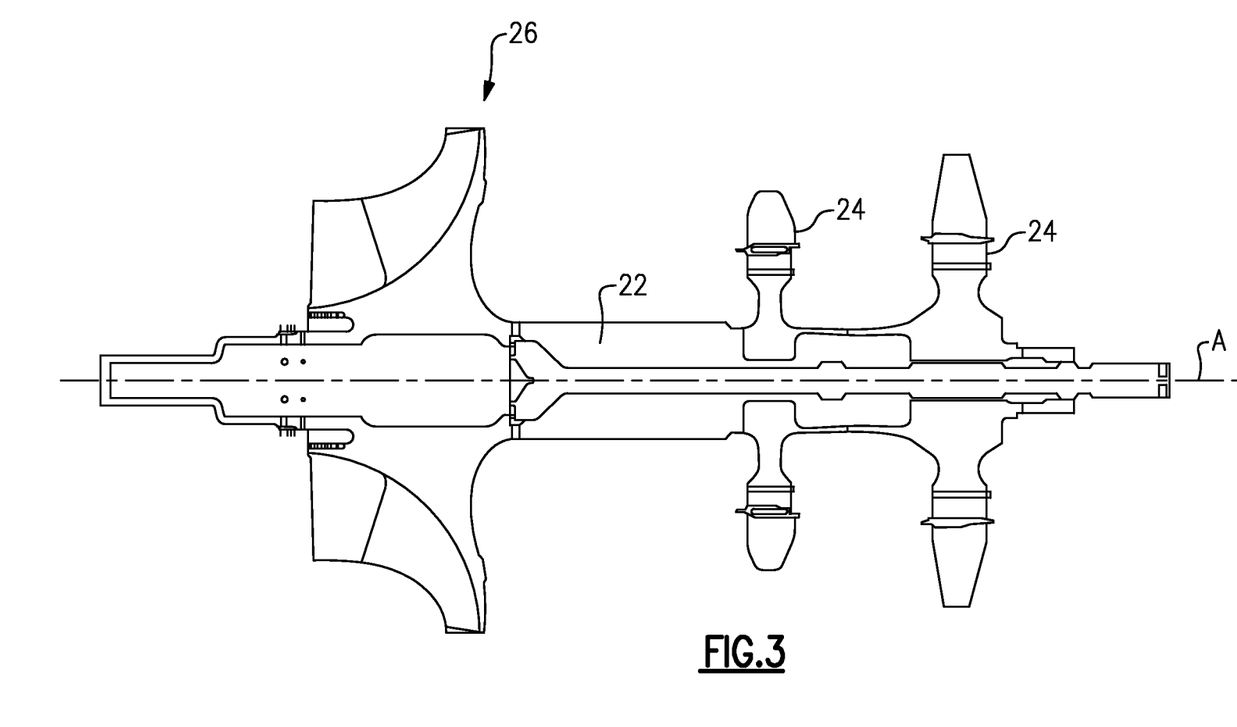
FIG. 3 is a schematic representation of a rotor assembly according to the embodiment of an auxiliary power unit.

Referring to FIG. 3 with continued reference to FIG. 1, the compressor section 16 includes a compressor wheel 26 supported on the shaft 22. The turbine 20 includes turbine stages 24 that are also secured to the shaft 22. In this example, the turbine 20 includes two (2) stages however the turbine 20 may include any number of stages. The turbine 20 drives the compressor wheel 26 through the shaft 22 about a common axis A.

Figure 4:
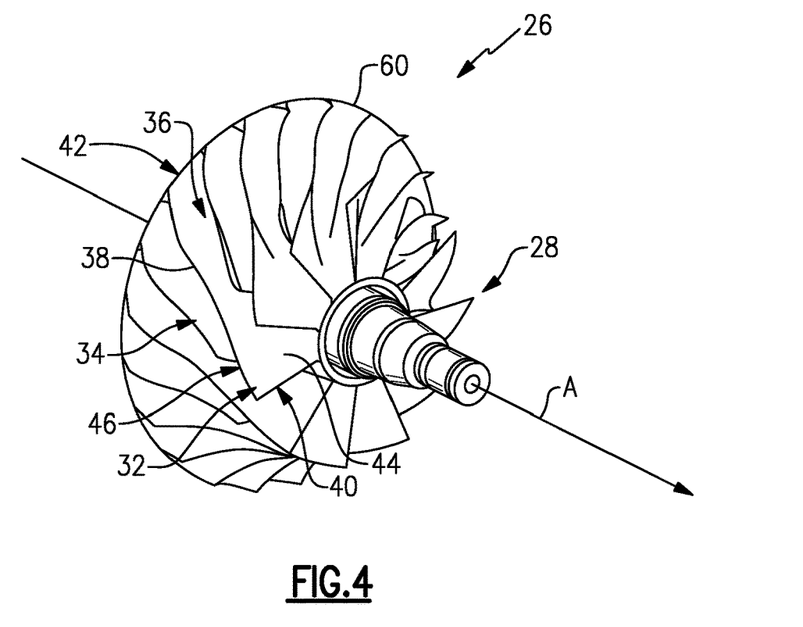
FIG. 4 is a perspective view of a front side of a compressor wheel according to an embodiment.
Figure 5:
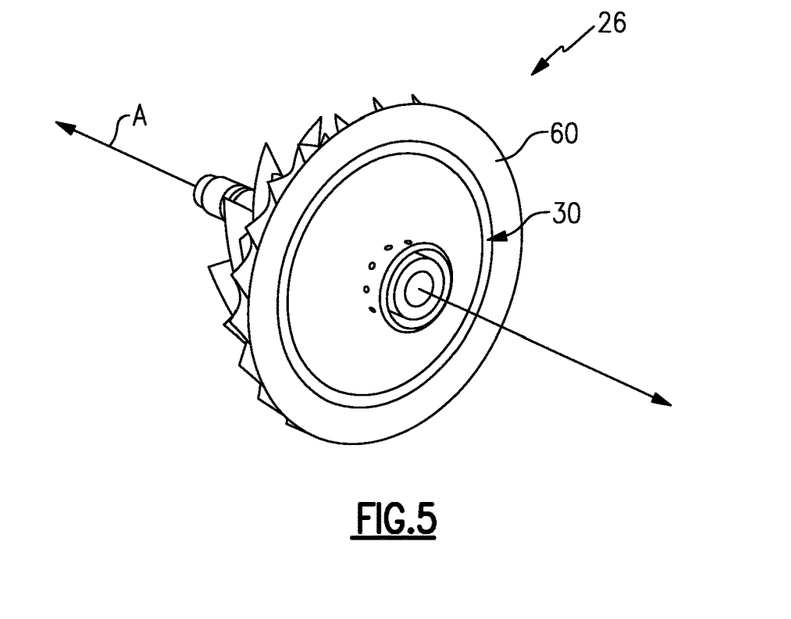
FIG. 5 is a perspective view of a back side of the compressor wheel according to an embodiment.

Referring to FIGS. 4 and 5, the example compressor wheel 26 includes a plurality of impeller blades 32, 34 that provide movement and compression of air through the compressor section 16. The impeller blades include both a plurality of long or main impeller blades 32 and a plurality of short or splitter blades 34. The splitter blades 34 are interposed between corresponding main impeller blades 32.

Each of the impeller blades 32, 34 includes a leading edge 40, a trailing edge 42, a blade root 36, and a blade tip 38. The impeller blades 32,34 further includes a first surface 44 and a second surface 46 and extend upward from a hub 60 in a contoured manner that moves air flow through the compressor section 16 for communicating air flow to the combustor 18. In this embodiment, the first surface 44 is a suction side of the impeller blade and the second surface 46 is a pressure side of the impeller blade.

The configuration of the first surface 44 and the second surface 46 changes in view of various dimensional parameters such as curvature, thickness, twist, and taper from the blade root 36 to the blade tip 38 and from the leading edge 40 to the trailing edge 42. Moreover, the example compressor wheel 26 may be directionally scaled up or down to accommodate larger or smaller APU 10 configurations and performance requirements.

Referring to FIGS. 6-10, each of the plurality of main blades 32 and splitter blades 34 includes the first surface 44 and second surface 46 that are shaped to provide continuous contour from the leading edge 40 to the trailing edge 42 and from the blade root 36 to the blade tip 38. The shape of each of the main impeller blades 32 and splitter blades 34 is defined by a set of points such as in this example Cartesian coordinates along a boundary for each of the surfaces 44, 46. Because a word description is difficult to construct that fully captures the three dimensional contours of each blade surface, one non-limiting dimensional embodiment is provided for the first surface 44 and the second surface 46 of the splitter blades 34 as set out in Tables S1 and S2. Table S1 defines the first surface 44 and table S2 defines the second surface 46.

TABLE S1

| X | Y | Z |
|---|---|---|
| 4.8471 | 3.9608 | 1.7883 |
| 4.9559 | 3.9127 | 1.8313 |
| 5.0646 | 3.8642 | 1.8746 |
| 4.9987 | 3.5896 | 1.4473 |
| 4.8682 | 3.6693 | 1.4204 |
| 4.7373 | 3.7486 | 1.3935 |
| 4.5449 | 3.5558 | 1.0983 |
| 4.7099 | 3.4203 | 1.0992 |
| 4.8746 | 3.2842 | 1.1009 |
| 4.6816 | 2.9617 | .8092 |
| 4.4869 | 3.1809 | .8222 |
| 4.2913 | 3.3988 | .8379 |
| 4.0423 | 3.2971 | .6184 |
| 4.2364 | 2.9757 | .5855 |
| 4.4293 | 2.6524 | .5558 |

TABLE S1-continued

| X | Y | Z |
|---|---|---|
| 4.1110 | 2.3562 | .3291 |
| 3.9223 | 2.7839 | .3337 |
| 3.7331 | 3.2121 | .3407 |
| 3.6204 | 3.1881 | .2319 |
| 3.7806 | 2.7063 | .2233 |
| 3.9383 | 2.2232 | .2196 |
| 3.7536 | 2.0970 | .1017 |
| 3.6051 | 2.6258 | .0780 |
| 3.4556 | 3.1555 | .0571 |

TABLE S2

| X | Y | Z |
|---|---|---|
| 4.8502 | 4.0061 | 1.7628 |
| 4.9584 | 3.9776 | 1.7946 |
| 5.0671 | 3.9499 | 1.8263 |
| 5.0110 | 3.6736 | 1.3813 |
| 4.8798 | 3.7298 | 1.3719 |
| 4.7489 | 3.7865 | 1.3622 |
| 4.5593 | 3.5833 | 1.0654 |
| 4.7261 | 3.4705 | 1.0437 |
| 4.8928 | 3.3589 | 1.0215 |
| 4.7045 | 3.0218 | .7209 |
| 4.5050 | 3.2188 | .7657 |
| 4.3062 | 3.4169 | .8080 |
| 4.0565 | 3.3097 | .5922 |
| 4.2542 | 3.0029 | .5324 |
| 4.4529 | 2.6975 | .4698 |
| 4.1410 | 2.3921 | .2373 |
| 3.9433 | 2.8045 | .2816 |
| 3.7489 | 3.2201 | .3177 |
| 3.6357 | 3.1936 | .2120 |
| 3.8013 | 2.7221 | .1764 |
| 3.9685 | 2.2515 | .1347 |
| 3.7797 | 2.1143 | .0351 |
| 3.6238 | 2.6362 | .0415 |
| 3.4718 | 3.1593 | .0390 |

The tables S1 and S2 are shown in Cartesian coordinate system (FIG. 8) including x, y and z points for each of the splitter blade 34 first and second surfaces. The Cartesian coordinates system has orthogonally related X, Y, and Z axes with the Z and Y axis extending generally in a radial direction relative to the axis of rotation A and the X axis extending parallel with the axis of rotation A. The X coordinate defines a distance 48 along the X axis from an X Datum plane. The Y coordinate defines a distance 52 along the Y axis from a Y Datum plane and the Z coordinate defines a distance 50 along the Z axis from a Z datum plane.

Figures 7, 8:
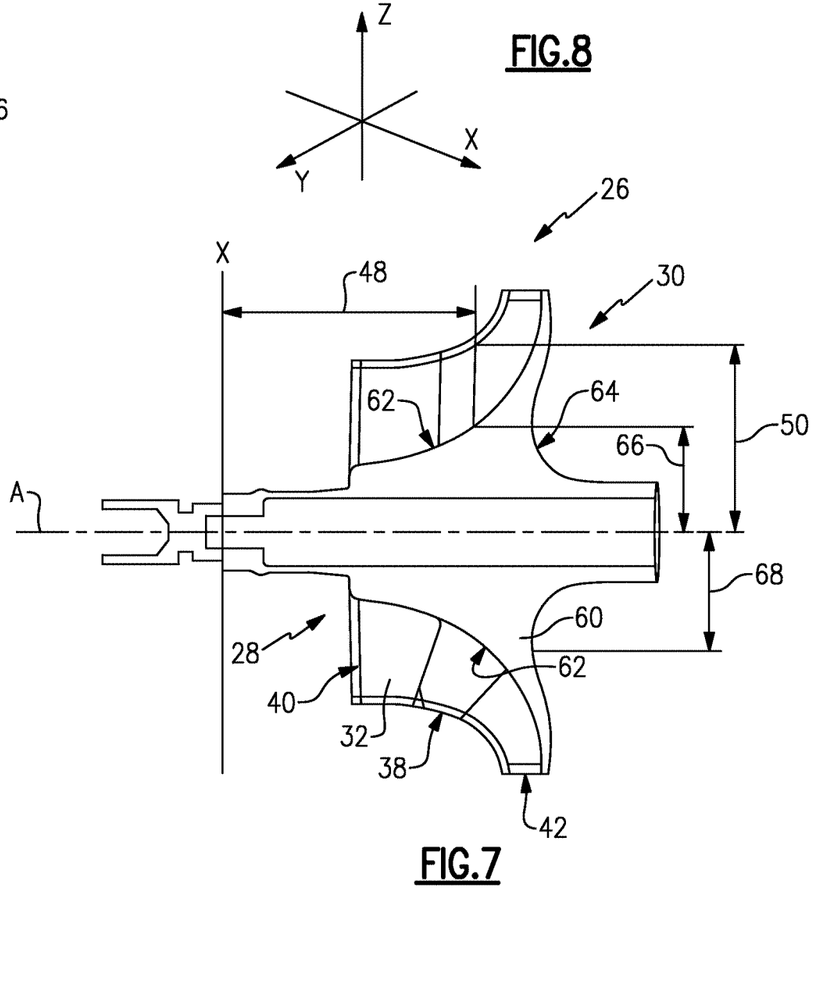
FIG. 7 is a cross section of the compressor wheel according to an embodiment.
FIG. 8 is a schematic representation of Cartesian Coordinate system relating to points along a surface of an impeller blade according to an embodiment.
Figure 9:
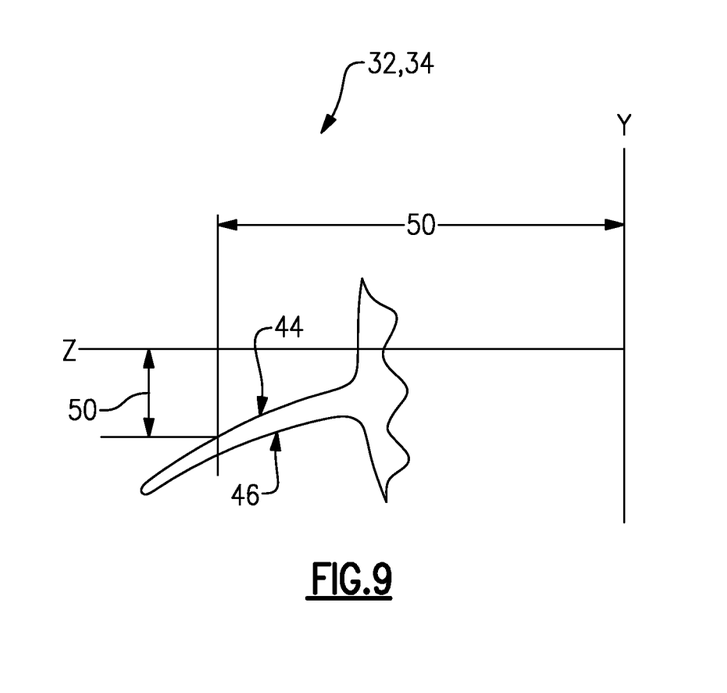
FIG. 9 is a schematic representation of a portion of an impeller blade according to an embodiment of the compressor wheel.
Figure 10:
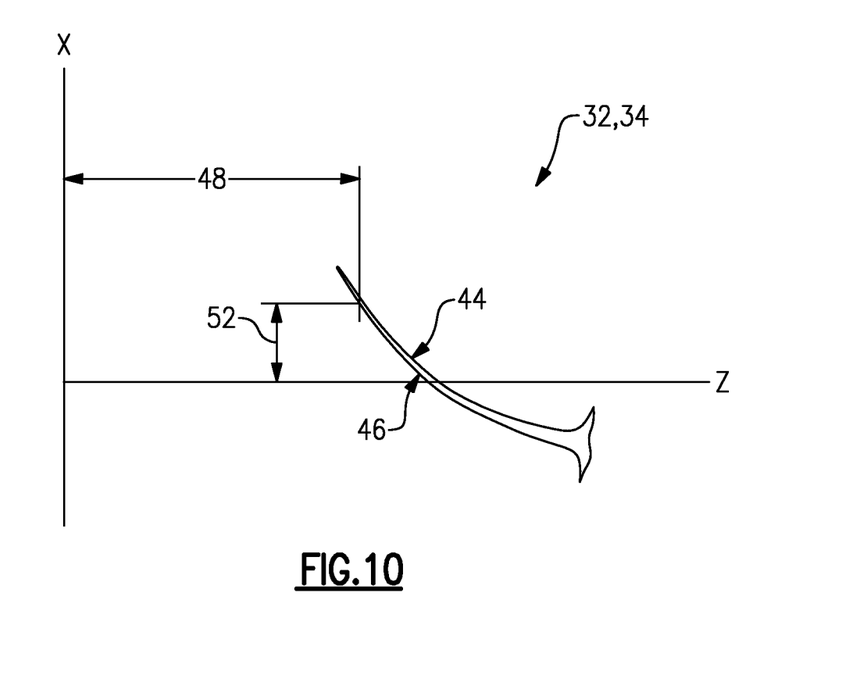
FIG. 10 is another schematic view of a portion of an impeller blade according to an embodiment of the compressor wheel.

In this instance, the X-coordinate defines the distance 48 along the X axis parallel to the axis of rotation A. The Y-coordinate is the distance 52 in a first radial direction relative to the axis or rotation A along the Y Axis. The distance 50 along the Z-axis defines a point in a second radial direction relative to the axis of rotation A along the Z axis.

By defining X, Y and Z coordinate values at selected locations in radial and axial directions with respect to the specific datum; the first and second surfaces 44, 46 can be ascertained. By connecting the coordinate values with smooth continuing arcs a profile and contour of each surface 44, 46 are defined. The surface profiles at the various radial locations are thereby ascertained by connecting the adjacent coordinates. Although the axes are orientated in the disclosed fashion, it should be appreciated that the X, Y and Z axes may have any orientation provided that the axes are orientated with respect to each other and one axis extends along the height of each of the impeller blades 32, 34.

In a further example, the contours of each of the main impeller blades 32 are provided in tables M1 and M2 respectively provided below.

TABLE M1

| X | Y | Z |
|---|---|---|
| 4.8464 | 3.9579 | 1.7811 |
| 4.9553 | 3.9103 | 1.8266 |
| 5.0638 | 3.8621 | 1.8722 |
| 4.9976 | 3.5883 | 1.4488 |
| 4.8675 | 3.6685 | 1.4212 |
| 4.7371 | 3.7482 | 1.3938 |
| 4.5435 | 3.5542 | 1.1005 |
| 4.7079 | 3.4179 | 1.1025 |
| 4.8721 | 3.2811 | 1.1053 |
| 4.6828 | 2.9639 | .8178 |
| 4.5000 | 3.1871 | .8400 |
| 4.3152 | 3.4098 | .8656 |
| 4.0269 | 3.2911 | .6107 |
| 4.2256 | 2.9693 | .5862 |
| 4.4230 | 2.6470 | .5652 |
| 4.1089 | 2.3551 | .3406 |
| 3.9288 | 2.7845 | .3501 |
| 3.7478 | 3.2146 | .3629 |
| 3.4615 | 3.1564 | .0756 |
| 3.6033 | 2.6241 | .1002 |
| 3.7437 | 2.0914 | .1297 |
| 3.3398 | 1.8592 | −.0883 |
| 3.2424 | 2.4728 | −.2006 |
| 3.1424 | 3.0874 | −.3059 |
| 2.8233 | 2.9816 | −.7402 |
| 2.8669 | 2.3159 | −.5376 |
| 2.9092 | 1.6514 | −.3303 |
| 2.6909 | 1.5496 | −.4670 |
| 2.6799 | 2.2278 | −.7195 |
| 2.6642 | 2.9081 | −.9653 |
| 2.4908 | 2.8105 | −1.2089 |
| 2.4961 | 2.1348 | −.9030 |
| 2.4976 | 1.4614 | −.5911 |

TABLE M2

| X | Y | Z |
|---|---|---|
| 4.8503 | 4.0048 | 1.7543 |
| 4.9590 | 3.9778 | 1.7880 |
| 5.0680 | 3.9513 | 1.8215 |
| 5.0126 | 3.6770 | 1.3783 |
| 4.8812 | 3.7326 | 1.3694 |
| 4.7499 | 3.7886 | 1.3602 |
| 4.5604 | 3.5852 | 1.0631 |
| 4.7274 | 3.4730 | 1.0407 |
| 4.8944 | 3.3620 | 1.0176 |
| 4.7097 | 3.0298 | .7208 |
| 4.5216 | 3.2312 | .7749 |
| 4.3339 | 3.4333 | .8281 |
| 4.0469 | 3.3080 | .5767 |
| 4.2503 | 3.0031 | .5203 |
| 4.4546 | 2.6997 | .4605 |
| 4.1450 | 2.3954 | .2308 |
| 3.9566 | 2.8103 | .2830 |
| 3.7699 | 3.2264 | .3306 |
| 3.4853 | 3.1625 | .0473 |
| 3.6367 | 2.6413 | .0326 |
| 3.7904 | 2.1208 | .0111 |
| 3.3952 | 1.8711 | −.2072 |
| 3.2789 | 2.4797 | −.2644 |
| 3.1654 | 3.0881 | −.3292 |
| 2.8470 | 2.9783 | −.7595 |
| 2.9061 | 2.3110 | −.5921 |
| 2.9693 | 1.6425 | −.4339 |
| 2.7441 | 1.5323 | −.5510 |
| 2.7128 | 2.2191 | −.7622 |
| 2.6866 | 2.9034 | −.9822 |
| 2.5118 | 2.8046 | −1.2235 |

TABLE M2-continued

| X | Y | Z |
|---|---|---|
| 2.5232 | 2.1242 | −.9345 |
| 2.5407 | 1.4401 | −.6542 |

Moreover, in a further non-limiting dimensional embodiment, a front surface 62 of the hub 60 between each of the impeller blades 32, 34 is determined by a set of coordinates defined in table H1. The hub 60 includes the front surface 62 from which the plurality of splitter and plurality of main blades extends. The front surface 62 is defined as a set of X-coordinates and Rh-coordinates set out in Table H1, wherein X-coordinates extend axially and the Rh-coordinate extend radially. The front surface 62 is defined as a radial Rh indicated at 66 in FIG. 7 and a distance 48 along the X axis parallel with the axis of rotation.

TABLE H1

| $R_H$ | X |
|---|---|
| 1.290 | 2.261 |
| 1.321 | 2.503 |
| 1.371 | 2.742 |
| 1.439 | 2.976 |
| 1.523 | 3.205 |
| 1.622 | 3.428 |
| 1.735 | 3.644 |
| 1.863 | 3.852 |
| 2.004 | 4.051 |
| 2.158 | 4.240 |
| 2.325 | 4.418 |
| 2.504 | 4.583 |
| 2.695 | 4.734 |
| 2.897 | 4.870 |
| 3.110 | 4.980 |
| 3.332 | 5.091 |
| 3.561 | 5.175 |
| 3.796 | 5.239 |
| 4.036 | 5.284 |
| 4.278 | 5.311 |
| 4.522 | 5.320 |

In another example embodiment, the back side 30 of the compressor wheel 26 includes a back side surface 64 with a profile that is defined by coordinates defined in table H2. The a back side surface 64 is defined as a set of X-coordinates and Rb-coordinates set out in Table H2, wherein the X-coordinates extend axially and the Rb-coordinates extend radially The back side surface 64 is defined as a radial distance Rb indicated at 68 in FIG. 7 and a distance 48 along the X axis parallel with the axis of rotation.

TABLE H2

| $R_B$ | X |
|---|---|
| 1.030 | 5.946 |
| 1.042 | 5.833 |
| 1.075 | 5.716 |
| 1.128 | 5.606 |
| 1.226 | 5.489 |
| 1.310 | 5.423 |
| 1.443 | 5.337 |
| 1.560 | 5.276 |
| 1.683 | 5.226 |
| 1.810 | 5.188 |
| 1.940 | 5.164 |
| 2.025 | 5.155 |
| 2.120 | 5.148 |
| 2.213 | 5.145 |
| 2.338 | 5.147 |

TABLE H2-continued

| $R_B$ | X |
|---|---|
| 2.463 | 5.155 |
| 2.587 | 5.169 |
| 2.710 | 5.189 |
| 2.802 | 5.208 |
| 2.893 | 5.230 |
| 2.983 | 5.255 |
| 3.081 | 5.287 |
| 3.149 | 5.304 |
| 3.243 | 5.326 |
| 3.337 | 5.346 |
| 3.454 | 5.367 |
| 3.549 | 5.382 |
| 3.644 | 5.394 |
| 3.739 | 5.404 |
| 3.841 | 5.412 |
| 3.949 | 5.417 |
| 4.056 | 5.420 |
| 4.150 | 5.421 |
| 4.244 | 5.419 |
| 4.337 | 5.415 |
| 4.431 | 5.409 |
| 4.522 | 5.399 |

It should be appreciated that any of the table coordinate values may be scaled up or down geometrically in order to be introduced and to similar machined designs. It is therefore contemplated that the scaled version of the table coordinate values set forth may be obtained by multiplying or dividing each of the table coordinates values by a predetermined constant. It should be appreciated that table coordinate values could be considered a scaled profile that is equal to 1 and greater or lesser dimensional components are obtained by adjusting the values greater or less to 1, respectively.

Each of the tables defines a mean value for each point along the impeller blade and hub surface profiles. Manufacturing constraints and processes operate within an acceptable capability limit and therefore a manufacturing tolerance must be accounted for in each profile. Accordingly, the coordinates shown in the tables includes values of a component having a profile substantially in accordance with those values. However, it should be understood that a reasonable manufacturing tolerance should be considered within the design limits and are within the contemplation of this disclosure.

Figure 6:
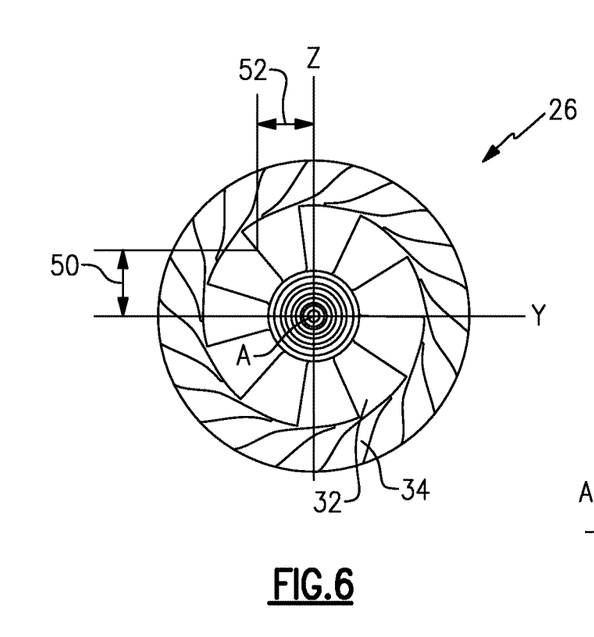
FIG. 6 is a front view of the compressor wheel according to an embodiment.
Figure 11:
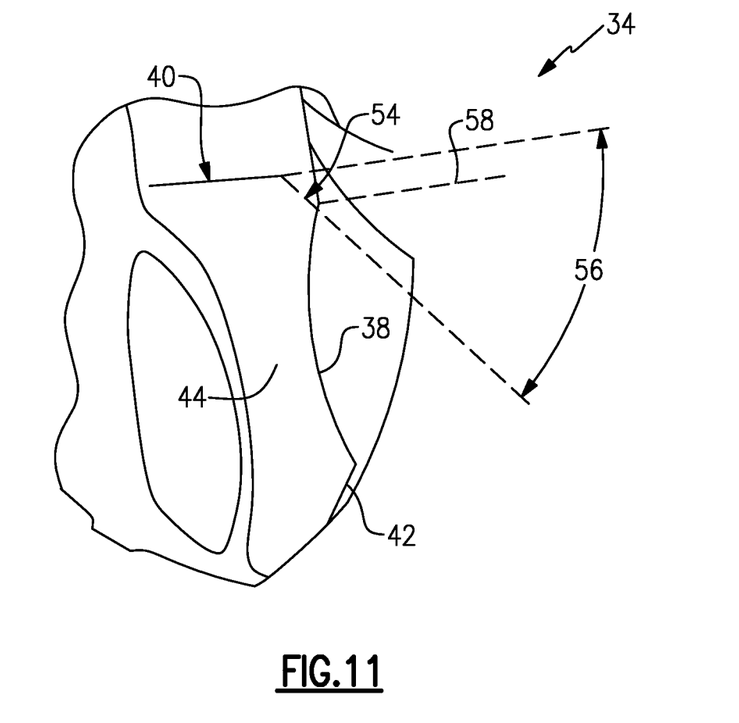
FIG. 11 is a sectional view of a portion of an impeller blade according to an embodiment of the compressor wheel.
Figure 12:
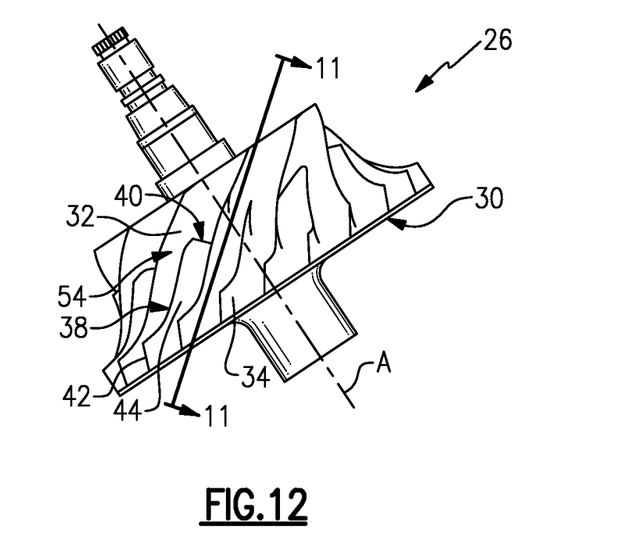
FIG. 12 is a side view of the impeller wheel according to an embodiment of the compressor wheel.

Referring to FIGS. 11 and 12 with continued reference to FIGS. 6 and 7, the blade tip 40 is potentially susceptible to degradation that may result from a resonance frequency of the splitter blade 34. The resonance frequency of the splitter blade 34 may occur due to rotational frequency of the compressor wheel 26 in combination with aerodynamic flow forces encountered by the compressor wheel 26.

The example splitter blade 34 includes a blade tip 40 with a contour 54 that makes the splitter blades 34 less prone to excitation at the resonance frequency. The contour 54 is a break in a corner between the leading edge 40 and the blade tip 34 that is blended into the contoured surface on one of the first and second surfaces 44, 46.

The example contour 54 is disposed between the leading edge 40 and the blade tip 38. The contour 54 extends between the blade tip 38 and the leading edge 40 at an angle 56. The contour 54 extends over a length 58 of the blade tip 38 from the leading edge 40 toward the trailing edge 42. The contour 54 reduces fatigue stresses encountered during operation of the compressor wheel 26. The inclusion of the contour 54 substantially reduces or prevents resonance excitation of the splitter blade 34 during operation and thereby reduces fatigue and other life shortening stresses encountered on the compressor wheel 26. Moreover, the contour 54 does not change the profile of the splitter blade 34 and thereby does not affect overall operation and performance of the auxiliary power unit 10.

A method of manufacturing an embodiment of the compressor wheel 26 includes a first step of forming a plurality of splitter blades 34 interposed between a plurality of main blades 32 on a hub 60. Each of the plurality of splitter blades 34 and main blades 32 are formed to include a root 36, a tip 38, a leading edge 40, a suction side 44 and a pressure side 46. The suction side 44 and the pressure side 46 of the splitter blades 34 are defined by the set of X-coordinates, Y-coordinates and Z-coordinates defined according to a corresponding one of Table S1 and Table S2 scaled by a desired factor. The X-coordinate is in an axial direction, the Y-coordinate is in a first radial direction and the Z-coordinate is in a second radial direction transverse to the first radial direction.

The method of manufacture further includes configuring the compressor wheel 26 such that the suction side 44 and a pressure side 46 of the plurality of main blades 32 are defined as a set of X-coordinates, Y-coordinates and Z-coordinates set out in Table M-1 and M-2 scaled by a desired factor. The X-coordinate is in the axial direction, the Y-coordinate is in the first radial direction and the Z-coordinate is in a second radial direction transverse to the first radial direction. Additionally, the compressor wheel 26 is configured such that a contour between the tip 38 and the leading edge 40 is disposed at angle between about 35 degrees and about 65 degrees relative to the leading edge 40 that intersects the leading edge 40 and the tip 38.

The example contoured impeller blades provide desired flow and pressure performance while having a negligible impact on the APU performance. Thus the life of the APU is extended with minimal additional costs. The disclosed blade contour not only provides a means to manufacture the part but also demonstrated a successful testing process for identifying and verifying blade contour capabilities.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A compressor impeller for an Auxiliary Power Unit (APU) comprising:
   a hub including a plurality of splitter blades interposed between a plurality of main blades, wherein each of the plurality of splitter blades and the plurality of main blades include a first surface and a second surface, the first surface and the second surface of the plurality of splitter blades are defined as a set of X-coordinates, Y-coordinates and Z-coordinates set out in Table S-1 and S-2 scaled by a desired factor, the X-coordinate being in an axial direction, the Y-coordinate being in a first radial direction and the Z-coordinate being in a second radial direction transverse to the first radial direction, wherein each of the plurality of splitter blades includes a contour between a tip and a leading edge.

2. The compressor impeller as recited in claim 1, wherein a first surface and a second surface of the plurality of main blades are defined as a set of X-coordinates, Y-coordinates and Z-coordinates set out in Table M-1 and M-2 scaled by a desired factor, the X-coordinate being in an axial direction, the Y-coordinate being in a first radial direction and the Z-coordinate being in a second radial direction transverse to the first radial direction.

3. A compressor impeller for an Auxiliary Power Unit (APU) comprising:
   a hub including a plurality of splitter blades interposed between a plurality of main blades, wherein each of the plurality of splitter blades and the plurality of main blades include a first surface and a second surface, the first surface and the second surface of the plurality of splitter blades are defined as a set of X-coordinates, Y-coordinates and Z-coordinates set out in Table S-1 and S-2 scaled by a desired factor, the X-coordinate being in an axial direction, the Y-coordinate being in a first radial direction and the Z-coordinate being in a second radial direction transverse to the first radial direction, wherein each of the plurality of splitter blades includes a contour between a tip and a leading edge;
   wherein a first surface and a second surface of the plurality of main blades are defined as a set of X-coordinates, Y-coordinates and Z-coordinates set out in Table M-1 and M-2 scaled by a desired factor, the X-coordinate being in an axial direction, the Y-coordinate being in a first radial direction and the Z-coordinate being in a second radial direction transverse to the first radial direction; and,
   wherein the first surface and the second surface defined by corresponding Tables M-1, M-2, S1 and S2 are adjusted by a manufacturing tolerance.

4. The compressor impeller as recited in claim 1, wherein the contour comprises a surface disposed at angle less than about 90 degrees relative to a leading edge of one or more of the plurality of splitter blades and the plurality of main blades that intersects the leading edge and the tip.

5. The compressor impeller as recited in claim 4, wherein the angle is between about 35 degrees and about 65 degrees relative to the leading edge.

6. The compressor impeller as recited in claim 1, wherein the hub comprises a front surface from which the plurality of splitter and plurality of main blades extends, wherein the front surface is defined as a set of X-coordinates and Rh-coordinates set out in Table H1, wherein X-coordinates extend axially and the Rh-coordinate extend radially.

7. The compressor impeller as recited in claim 1, wherein the hub comprises a back side surface defined as a set of X-coordinates and Rb-coordinates set out in Table H2, wherein the X-coordinates extend axially and the Rb-coordinates extend radially.

8. An auxiliary power unit comprising;
   a compressor section including an impeller, the impeller including a plurality of splitter blades interposed between a plurality of main blades, wherein each of the plurality of splitter blades includes a suction side and a pressure side, wherein the suction side and the pressure side are defined by a set of X-coordinates, Y-coordinates and Z-coordinates defined according to a corresponding one of Table S1 and Table S2 scaled by a desired factor, the X-coordinate being in an axial direction, the Y-coordinate being in a first radial direction and the Z-coordinate being in a second radial direction transverse to the first radial direction wherein each of the plurality of splitter blades includes a contour between a tip and a leading edge.

9. The auxiliary power unit as recited in claim 8, wherein a suction side and a pressure side of the plurality of main blades are defined as a set of X-coordinates, Y-coordinates and Z-coordinates set out in Table M-1 and M-2 scaled by a desired factor, the X-coordinate being in an axial direction, the Y-coordinate being in a first radial direction and the Z-coordinate being in a second radial direction transverse to the first radial direction.

10. An auxiliary power unit comprising;
a compressor section including an impeller, the impeller including a plurality of splitter blades interposed between a plurality of main blades, wherein each of the plurality of splitter blades includes a suction side and a pressure side, wherein the suction side and the pressure side are defined by a set of X-coordinates, Y-coordinates and Z-coordinates defined according to a corresponding one of Table S1 and Table S2 scaled by a desired factor, the X-coordinate being in an axial direction, the Y-coordinate being in a first radial direction and the Z-coordinate being in a second radial direction transverse to the first radial direction wherein each of the plurality of splitter blades includes a contour between a tip and a leading edge;
wherein a suction side and a pressure side of the plurality of main blades are defined as a set of X-coordinates, Y-coordinates and Z-coordinates set out in Table M-1 and M-2 scaled by a desired factor, the X-coordinate being in an axial direction, the Y-coordinate being in a first radial direction and the Z-coordinate being in a second radial direction transverse to the first radial direction; and
wherein the suction side and the pressure side defined by corresponding Tables M-1, M-2, S1 and S2 are adjusted by a manufacturing tolerance.

11. The auxiliary power unit as recited in claim 8, wherein the contour comprises a surface disposed at angle less than about 90 degrees relative to the leading edge that intersects the leading edge and the tip.

12. The auxiliary power unit as recited in claim 11, wherein the angle of the contour is between about 35 degrees and about 65 degrees relative to the leading edge.

13. The auxiliary power unit as recited in claim 8, wherein the impeller includes a hub and the hub comprises a front surface from which the plurality of splitter and plurality of main blades extends, wherein the front surface is defined as a set of X-coordinates and Rh-coordinates set out in Table H1, wherein X-coordinates extend axially and the Rh-coordinate extend radially.

14. The auxiliary power unit as recited in claim 8, wherein the impeller includes a hub and the hub comprises a back face defined as a set of X-coordinates and Rb-coordinates set out in Table H2, wherein the X-coordinates extend axially and the Rb-coordinates extend radially.

15. The auxiliary power unit as recited in claim 8, including a combustor section and a turbine section coupled to the compressor section through a main shaft, wherein the combustor section is configured to mix compressed air from the compressor section with fuel and to ignite the fuel air mixture to generate a high-speed exhaust gas flow that expands through the turbine section to drive the compressor section.

16. A method of manufacturing a compressor wheel for an auxiliary power unit, the method including:
forming an compressor wheel to include a plurality of splitter blades interposed between a plurality of main blades, wherein each of the plurality of splitter blades include a root, a tip, a leading edge, a suction side and a pressure side, wherein the suction side and the pressure side are defined by a set of X-coordinates, Y-coordinates and Z-coordinates defined according to a corresponding one of Table S1 and Table S2 scaled by a desired factor, the X-coordinate being in an axial direction, the Y-coordinate being in a first radial direction and the Z-coordinate being in a second radial direction transverse to the first radial direction wherein each of the plurality of splitter blades includes a contour between the tip and the leading edge.

17. The method as recited in claim 16, further including configuring the compressor wheel such that a suction side and a pressure side of the plurality of main blades are defined as a set of X-coordinates, Y-coordinates and Z-coordinates set out in Table M-1 and M-2 scaled by a desired factor, the X-coordinate being in an axial direction, the Y-coordinate being in a first radial direction and the Z-coordinate being in a second radial direction transverse to the first radial direction.

18. The method as recited in claim 16, further including configuring the contour as a surface disposed at angle between about 35 degrees and about 65 degrees relative to the leading edge that intersects the leading edge and the tip.

* * * * *